E. KEUP.
NON-PUNCTURABLE RESILIENT WHEEL.
APPLICATION FILED FEB. 20, 1912.

1,085,435.

Patented Jan. 27, 1914.

WITNESSES

INVENTOR
Emil Keup,
BY
F. M. Wright,
ATTORNEY

UNITED STATES PATENT OFFICE.

EMIL KEUP, OF SAN FRANCISCO, CALIFORNIA.

NON-PUNCTURABLE RESILIENT WHEEL.

1,085,435.  Specification of Letters Patent.  Patented Jan. 27, 1914.

Application filed February 20, 1912.  Serial No. 678,778.

*To all whom it may concern:*

Be it known that I, EMIL KEUP, a citizen of the United States, residing at San Francisco, in the county of San Francisco and State of California, have invented new and useful Improvements in Non-Puncturable Resilient Wheels, of which the following is a specification.

The object of the present invention is to provide a wheel having the great resiliency derived from a pneumatic tube, which tube is nevertheless preserved from puncturing, thus avoiding the objections to wheels with pneumatic tires as at present generally used for self-propelled vehicles and velocipedes.

Figure 1:
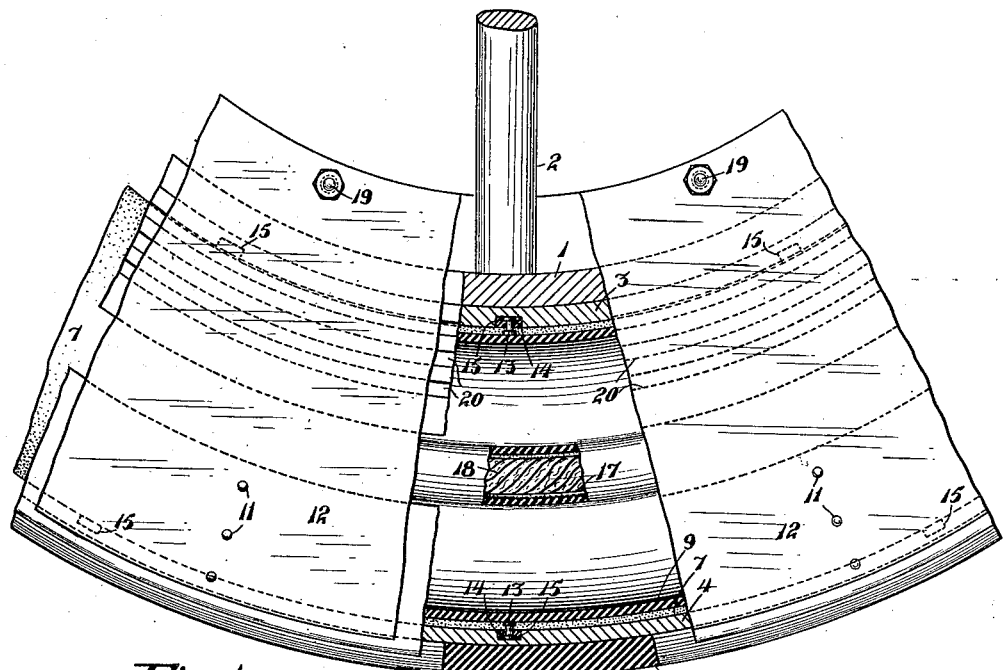
Figure 2:
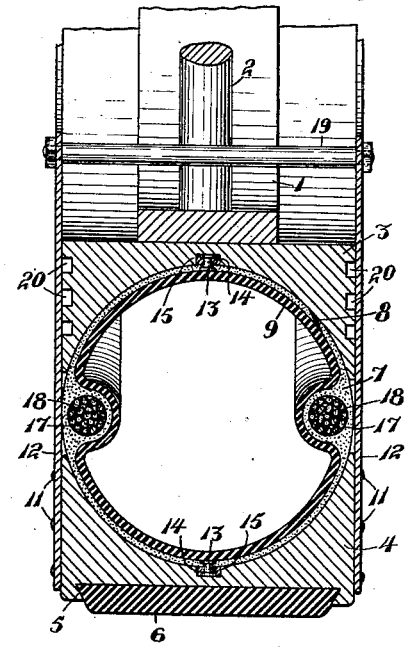

In the accompanying drawing, Figure 1 is a broken side view of a portion of a wheel constructed in accordance with my invention; Fig. 2 is a transverse section thereof.

Referring to the drawing, 1 indicates a rim of a wheel secured to spokes 2, one only being here shown. Secured to said rim is an inner ring 3, the outer surface of which is concaved, so that its cross-sectional form is a circular arc in magnitude almost a semicircle.

4 indicates the outer ring, the cross-sectional form of which closely corresponds to that of the inner ring except that the concave surface of said outer ring is the inner surface. Secured in an annular recess 5 in the outer surface of said outer ring is an annular tread 6 of rubber.

Contained between the concave surfaces of the inner and outer rings 3 and 4 is an annular tube 7 of canvas or other flexible material, which tube is split or severed in a circumferential direction, as shown at 8, the edges of the cut thus made being beveled and arranged to overlap each other. There are secured to said tube, by rivets 13, at suitable intervals and at diametrically opposite points thereof, rubber blocks 14, which enter recesses 15 in, and are likewise cemented to the inner and outer rings respectively, and thus prevent a peripheral or longitudinal movement of adjacent portions of the tube 7 with reference to said inner and outer rings respectively. Within the annular tube 7 is contained an annular tube 9 of soft rubber, which tube can be inflated in the ordinary manner. The tube 7 is split or severed for the purpose of obtaining access to said inner tube 9. Said inner tube being filled with air under great pressure, the inner ring 3 is supported by said tube resiliently upon the outer ring 4 in a manner similar to the support given by a pneumatic tire. In order to guide said inner tube in its movement to and from the outer tube, and to prevent it from moving laterally relative to said outer tube, there are secured, as shown at 11, to the sides of said outer ring 4, annular plates 12 the inner marginal portions of which are bolted together by bolts 19.

In order to prevent cutting of the portions of the rubber tube 9 which are adjacent to the meeting edges of the inner and outer rings 3 and 4, when the inner ring is depressed by the weight of the vehicle toward the outer ring, there are formed in the material of the tube two annular pockets 17 in which are contained cords 18, which, when the tube is in position between the concave surfaces of the inner and outer rings, produce annular inwardly extending protuberances, and cause the inner tube likewise to bend inwardly, said inwardly bending portions being thereby removed from the danger of being cut by the pressure of the adjacent edges of the inner and outer rings.

In the sides of the inner ring are formed annular grooves 20, the purpose of which is to catch and retain any dust that may find its way between the side of the ring and the adjacent plate, and thus prevent the dust from passing into contact with the tube 7 unless said grooves 20 are completely filled.

I claim:—

In a wheel, the combination of inner and outer rings, the opposing faces of which are concave, plates secured to the sides of one of said rings, in contact with which the sides of the other ring can slide, an annular tube of flexible material between the inner and outer rings formed at the parts adjacent to the opposing edges of the inner and outer rings with inwardly extending protuberances, means for preventing the circumferential movement of each ring relatively to the adjacent portion of the tube, and an inner rubber tube within the first-named tube.

In testimony whereof I have hereunto set my hand in the presence of two subscribing witnesses.

EMIL KEUP.

Witnesses:
 FRANCIS M. WRIGHT,
 D. B. RICHARDS.

Copies of this patent may be obtained for five cents each, by addressing the "Commissioner of Patents, Washington, D. C."